No. 732,884. PATENTED JULY 7, 1903.
L. P. NORMANDIN.
LIFTER FOR BUILDING BLOCKS.
APPLICATION FILED NOV. 25, 1902.
NO MODEL.
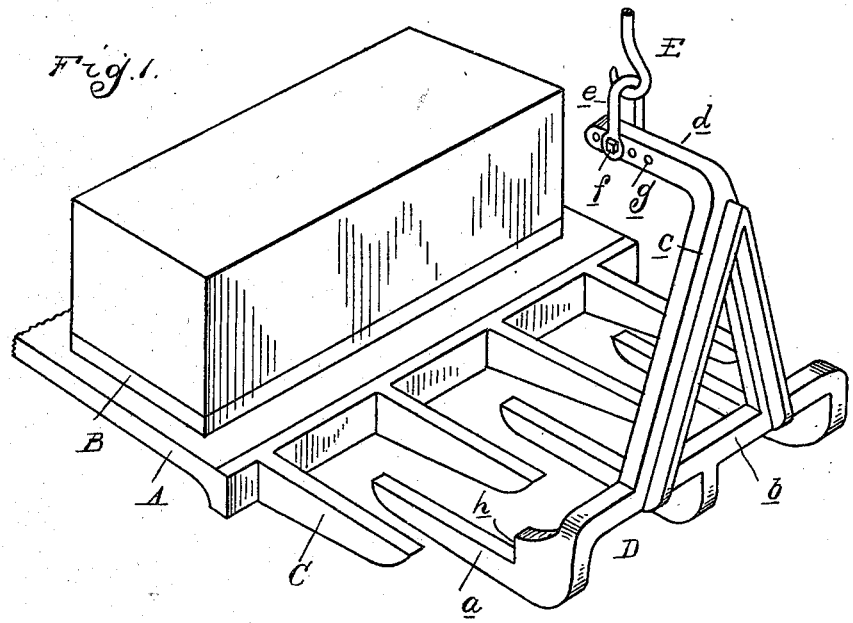
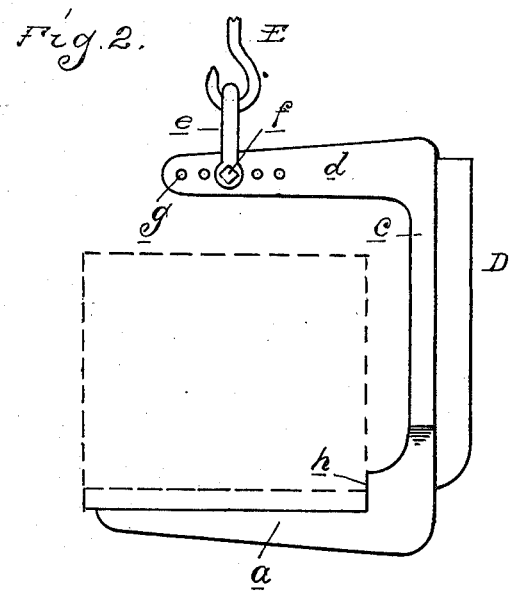
Witnesses
Inventor
Levi P. Normandin
By
attys.

No. 732,884. Patented July 7, 1903.

UNITED STATES PATENT OFFICE.

LEVI P. NORMANDIN, OF JACKSON, MICHIGAN, ASSIGNOR OF THREE-FOURTHS TO WILLIAM F. COWHAM, OF JACKSON, MICHIGAN.

LIFTER FOR BUILDING-BLOCKS.

SPECIFICATION forming part of Letters Patent No. 732,884, dated July 7, 1903.

Application filed November 25, 1902. Serial No. 132,744. (No model.)

*To all whom it may concern:*

Be it known that I, LEVI P. NORMANDIN, a citizen of the United States, residing at Jackson, in the county of Jackson and State of Michigan, have invented certain new and useful Improvements in Lifters for Building-Blocks, of which the following is a specification, reference being had therein to the accompanying drawings.

The invention relates to lifters, being more especially designed for use in connection with the manufacture of building-blocks. These blocks are usually formed by the molding of cementitious plastic material upon a suitable bottom plate or pallet, the molded block being permitted to remain on said pallet until the cement has hardened. It is necessary, however, that the block be removed from the machine in order that the latter may be used for forming other blocks. Heretofore this has been done by providing lifting devices which engage with opposite ends of the pallet or bottom plate; but it has been found in practice that the weight of the material in the block will often flex the supporting-plate, so as to injure the shape of the block.

It is the object of the present invention to provide means for removing the molded block upon its pallet or bottom plate without danger of in any way injuring the shape of the block.

To this end the invention consists in the peculiar construction of the lifter having supporting-bearing for the bottom plate intermediate the ends thereof, and, further, in the peculiar construction, arrangement, and combination of parts, as hereinafter more fully described and shown.

In the drawings, Figure 1 is a perspective view showing a portion of the bed upon which the block is molded, together with the block supported on its pallet and the lifter for removing the same. Fig. 2 is a side elevation showing the lifter in engagement with the block.

A is the bed of the machine, on which the block is molded. Upon this bed is supported the pallet B, which in the molding of the block forms the bottom plate of the mold. After the formation of the block by mechanism which forms no part of the present invention the pallet B is slid over the bed to one edge thereof, which is provided with a series of spaced projecting arms C.

D is the lifter, which comprises a series of arms $a$, connected to a common head or crossbar $b$ and having an upwardly-projecting portion $c$, which in turn is provided with a laterally-projecting portion or arm $d$. This arm $d$ is connected to a suitable hoisting apparatus E, and in order that the block which is to be supported on the arms $a$ may be securely balanced a connection with the hoist is provided which is adjustable upon the arm $d$. This, as shown, comprises a clevis $e$ and a bolt $f$, engaging with one of a series of apertures $g$ in the arm $d$. The arms $a$ are preferably provided with shoulders $h$, against which the edge of the pallet may be placed. These arms $a$ are so spaced as to intermesh with the arms C of the bed A, and they are also arranged so as to support the pallet intermediate its ends, and thereby prevent any sagging.

With the construction described in operation the forming-block and its pallet are first slid over the bed and onto the arm C. The hoist E is then moved to carry the lifter D into a position where the arms $a$ may be inserted between the arms C and beneath the pallet, the shoulder $h$ bearing against the edge of said pallet. The clevises $e$ having been first properly adjusted according to the size of the block, it is evident that by lifting upon the hoist the block and pallet will be raised out of engagement with the arm C, after which they may be carried to any convenient position for remaining until the cement is hardened. To disengage the hook from the pallet and also to support said pallet so that it will not sag, a number of spaced bars may be arranged, corresponding in spacing to the arm C, upon the bed, and with the construction described the blocks may be quickly removed from the machine and without the slightest injury to the shape of the block.

What I claim as my invention is—

1. A lifter, comprising a plurality of arms extending in a common horizontal plane, an arm arranged therebetween in a higher plane, a transverse bar connecting the ends of the lower arms and bars oppositely inclined in a vertical plane connecting said upper arm with said transverse bar on opposite sides of the center thereof.

2. A lifter, comprising three parallel arms arranged in the same horizontal plane, an arm arranged in a higher plane and in the vertical plane of the central lower arm, a transverse bar connecting the ends of said lower arms, and a pair of oppositely-inclined bars connected at their upper ends to said upper arms and at their lower ends to said transverse bar intermediate the connection of said lower arms thereto.

3. A lifter for building-blocks comprising a plurality of arms extending in a common horizontal plane, an arm arranged centrally therebetween in a higher plane with connection between said lower and upper arms at one end thereof, shoulders formed on the lower arms for centering a block thereon, and a hoist connected to said upper arm.

4. A lifter, comprising a triangular frame arranged in a vertical plane and having the base thereof in a horizontal plane and extending beyond the sides, an arm extending laterally from the apex of the triangle, and a plurality of arms depending and extending transversely from said base in a common horizontal plane.

5. The combination with a bottom plate for supporting a molded building-block, a bed or table upon which said plate is adapted to rest during molding, and a series of space-arms extending horizontally from one edge of said bed of a lifter comprising a plurality of arms extending in a horizontal plane and adapted to be inserted between said space-arms on said bed, and a common connection from said lifter-arms to a point in a vertical line with the center of gravity of said lifter.

In testimony whereof I affix my signature in presence of two witnesses.

LEVI P. NORMANDIN.

Witnesses:
   KITTIE C. MORRISON,
   DANIEL H. PERRY.